July 29, 1969 J. E. McWILLIAMS 3,458,064
APPARATUS FOR LOADING BAGGED MAIL FROM A LOADING
DOCK INTO A HIGHWAY VEHICLE
Filed March 30, 1967 3 Sheets-Sheet 2

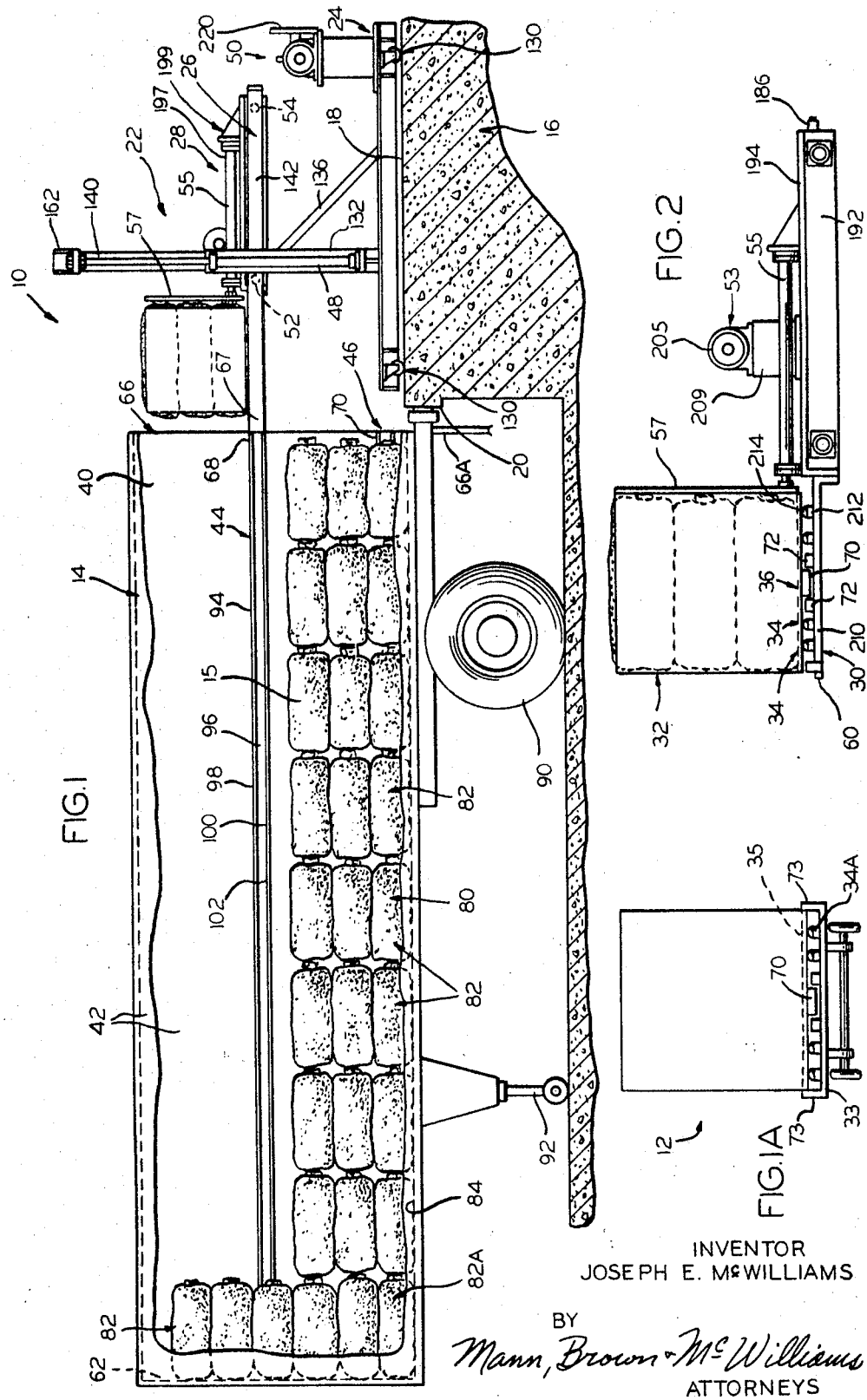

INVENTOR
JOSEPH E. McWILLIAMS

BY
Mann, Brown & McWilliams
ATTORNEYS

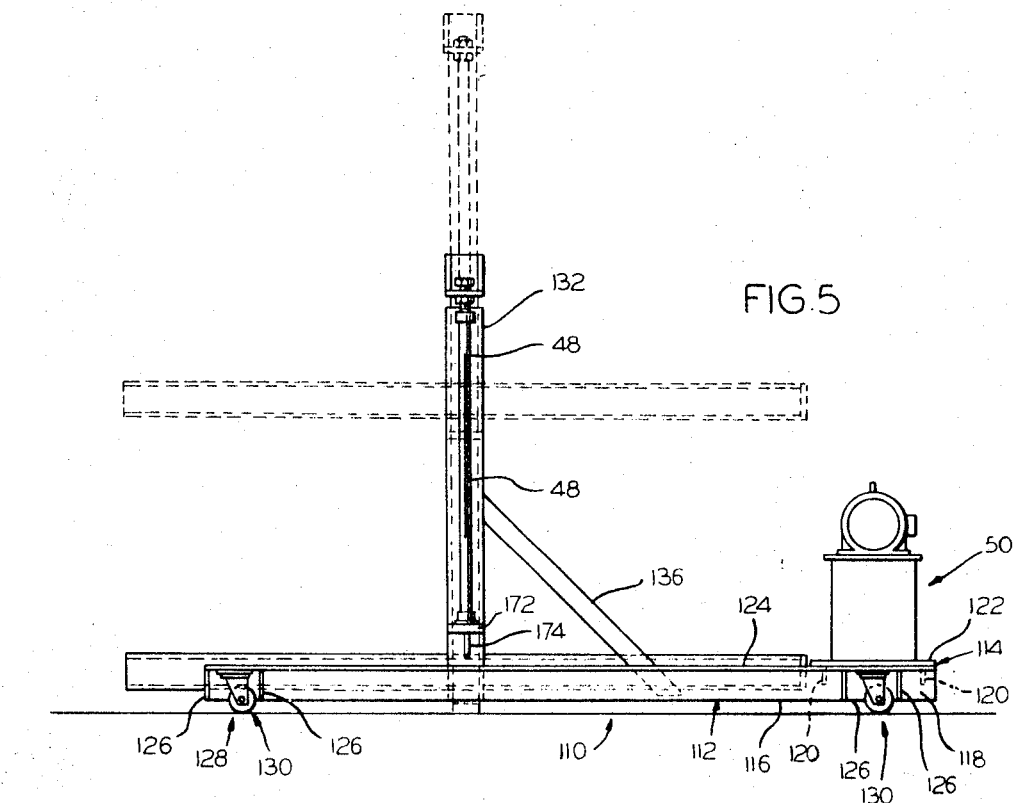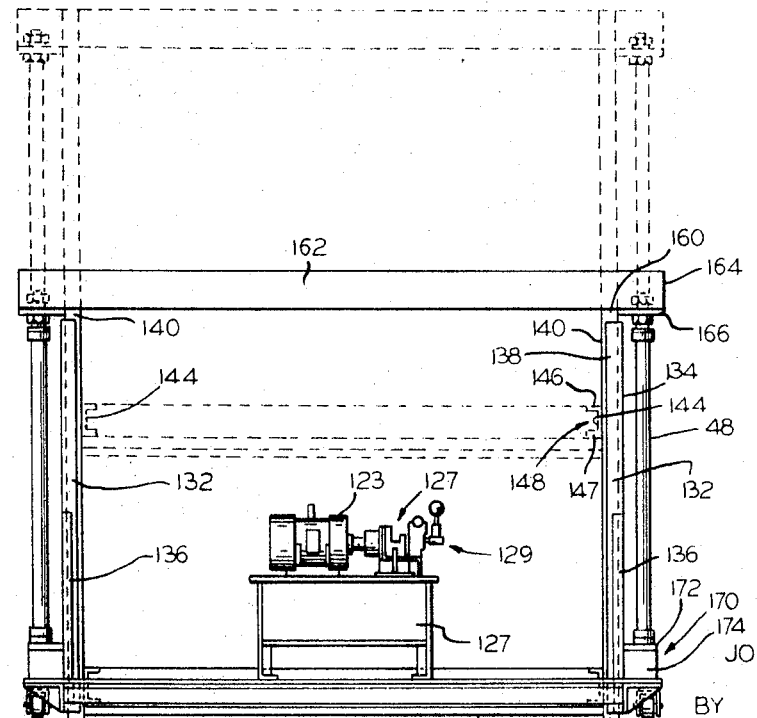

3,458,064
APPARATUS FOR LOADING BAGGED MAIL FROM A LOADING DOCK INTO A HIGHWAY VEHICLE
Joseph E. McWilliams, 1345 Canterbury Lane, Glenview, Ill. 60025
Filed Mar. 30, 1967, Ser. No. 627,217
Int. Cl. B65g 67/04
U.S. Cl. 214—41                                         6 Claims

ABSTRACT OF THE DISCLOSURE

The disclosure relates to a method and apparatus for loading bagged mail from a loading dock into an end loading highway vehicle, employing hand trucks of the type comprising a sideless demountable hand truck body supported on a wheeled base on which body mail bags are placed in tier fashion, in which a wheeled frame including a self propelled carriage riding on a horizontally disposed vertically movable trackway carried by the frame is disposed at the loading position of the vehicle in alignment with the rear end of same, and the demountable hand truck bodies are one by one separated from their bases and applied to the carriage for movement into the vehicle along the frame trackway that is selectively vertically aligned with vertically spaced longitudinally extending trackways mounted along the vehicle side walls. The carriage includes a pusher plate arrangement for discharging the mail bag load as a unit at the desired unloading point in the vehicle, whereupon the carriage returns to the loading dock to discharge the thus unloaded hand truck body and have another loaded one applied to same for unloaing in like manner.

---

My invention relates to a method and apparatus for loading bagged mail from a loading dock into a highway vehicle, and more particularly, to methods of and means for facilitating the handling of bagged mail in tiered groups for purposes of loading same into vehicles that are to transport it.

My Patent 3,164,271, granted Jan. 5, 1965 discloses a basic system for handling bagged mail which involves the sorting and loading of incoming bags into tier load units that are grouped by destination and stored until arrival of a suitable load transport vehicle whereupon the tier load units are loaded in single or multiple tier form in the vehicle.

Several embodiments of that basic system involve the loading of multiple tiered load units into special hand trucks in the form of hand truck bodies having the customary sideless form that are demountably associated with suitable wheeled bases, whereby the loaded hand truck bodies may be transferred to a lift truck that moves and positions the respective hand truck body loads as a whole to a point just above where that load is to arrive in the vehicle, whereupon a pusher plate that the lift truck is equipped with is operated to discharge the load as a unit from the individual hand truck bodies and then return the latter to their respective bases.

This manner of loading of mail bags in transport vehicles such as railway cars, motor trucks or semi-trailers is especially designed so as to fully utilize the capacity or volume of the transport vehicle body up to the maximum height to which the bags may be positioned in the vehicle. While this manner of loading may differ somewhat according to the type of carrier or transport body that is being used, in general the bags are laid down in tiers that run transversely of the length of the transport vehicle body with the length of the bags extending longitudinally with respect to the transport body and the tiers extending transversely thereof. Variations in bag loading, of course, cause variations in the width of the loaded bags, but regardless of these variations, the bags are to be snugly related to each other and each tier and successive tiers are placed one upon the other until the stack reaches the internal height of the vehicle transport body.

Conventional mail bag handling systems have required a considerable amount of handling of the individual bags themselves and usually by manual labor. This work is not only extremely tiresome and time-consuming, but involves a considerable amount of repetition of bag orienting movements as the bag is placed into position on hand trucks and subsequently is oriented for placing it in position in the tiers of the transport body.

A principal objective achieved by the methods and apparatus disclosed in my said patent is that the mail bags are oriented early in the cycle of their handling operations and this initial orientation is mantained throughout all of the subsequent handling operations. My Patent 3,266,645, granted Aug. 16, 1966 (which issued on my application Ser. No. 492,831, filed Oct. 4, 1965 which was a continuation-in-part of my application Ser. No. 355,144, filed Feb. 26, 1964, now Patent 3,209,926, which was a division of my said Patent 3,164,271), is specifically directed to arrangements and methods for loading demountable hand truck body loads into said opening and end opening transport vehicles (such as railroad cars, motor trucks, semi-trailers, etc.) in which the lift truck involved moves into the vehicle being loaded and stacks the tiered loads from the floor to the ceiling of the vehicle, working outwardly from the inner end thereof.

The principal object of the present invention is to provide methods and apparatus for further facilitating the loading of end opening vehicles without requiring that the operator enter the transport vehicle.

Another principal object of the invention is provide methods and apparatus for loading of end opening vehicles which permits a single operator to efficiently load the entire transport vehicle without stepping inside it.

Still other objects of the invention are to provide apparatus for loading bagged mail into transport vehicles that is adapted for full push button type actuation and control, to provide methods and apparatus for handling bagged mail that permits substantially automatic handling of the mail in tiered load groups, and to provide mail bag handling apparatus that is economical of manufacture, convenient in use, and adapted for use in all conventional mail bag loading dock areas or their equivalents.

Other objects and advantages will become obvious or be made apparent from a consideration of the following detailed description and the application drawings.

In the drawings:

FIGURE 1 is a diagrammatic side elevational view of a semi-trailer in the process of being loaded in accordance with my present invention, with parts being broken away and the adjacent loading dock and loading vehicle parking area being shown in section;

FIGURE 1A is an end elevation view of a demountable body hand truck that is preferably employed in practicing my present invention;

FIGURE 2 is a side elevational view of the self-propelled carriage that is associated with the hand truck body handling apparatus that is shown in FIGURE 1;

FIGURE 5 is a side elevational view of the apparatus shown in FIGURE 4 illustrating the elevation position thereof in broken lines; and FIGURE 6 is a rear elevational view of the apparatus shown in FIGURE 5.

Figure 3:
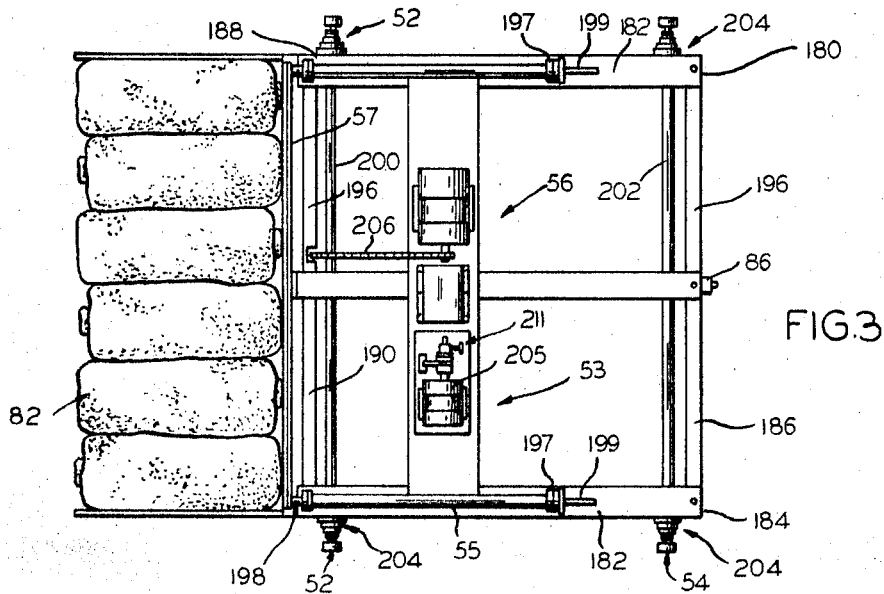
FIGURE 3 is a plan view of the carriage and its hand truck body load that is shown in FIGURE 2.

However, it is to be understood that the specific drawing illustrations provided are supplied primarily to comply with the requirements of 35 U.S.C. 112, and the invention may have other embodiments which are intended to be covered by the appended claims.

General description

Reference numeral 10 generally indicates one embodiment of my present invention that is preferably associated with mail bag handling equipment arranged in accordance with my said Patents 3,164,271 and 3,266,645 whereby loaded mail bags have been sorted as to destination and loaded in predetermined oriented relation in hand trucks 12 that have been accumulated and temporarily stored as necessary to await the arrival of a suitable transport body, which in accordance with the present invention is in the form of the end loading semi-trailer body 14.

It is assumed that the mail bag handling installation includes a suitable loading dock 16 provided with a level load support surface 18 and the usual shoulder or end 20 against which the vehicle 14 is backed up for purposes of being loaded by hand truck body handling apparatus 22.

Figure 4:
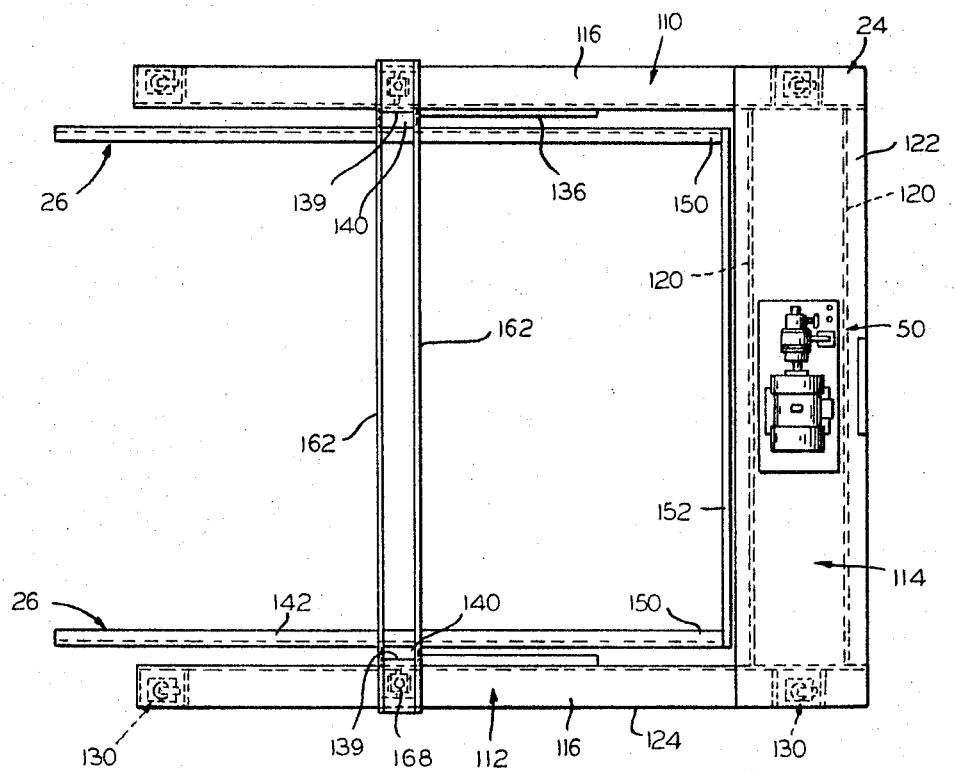
FIGURE 4 is a plan view of the wheeled frame apparatus of FIGURE 1 with which the carriage of FIGURES 2 and 3 is operably associated.

The hand truck body handling apparatus 22 comprises a wheeled frame 24 which carries a pair of vertically movable and opposed trackways 26 in which ride a carriage 28 carrying a load support platform 30 on which is received the individual hand truck bodies 32 that have been shifted off their bases 34 following the teachings of my said Patent 3,164,271 (see, for instance, FIGURES 11–13 thereof). To this end, the carriage load support platform 30 is provided with a plurality of suitable antifriction devices 34 and guide means 36 to make for ease of shifting the hand truck bodies 32 from their bases 33, and these may be of the type illustrated or those indicated in FIGURES 4 and 12 of my said Patent No. 3,164,271; the hand truck bases are similarly equipped.

Further in accordance with this invention, the inside wall surfaces 40 of the highway vehicle side walls 42 are provided with two pairs of vertically spaced trackways 44 and 46 that run the length of the side walls 42 and are of the same shape as trackways 26 so that when the trackways 26 are aligned either with the trackways 46 or the trackways 44, the thus aligned trackways form in effect one continuous trackway for the carriage 28 to move horizontally in.

The trackways 26 are preferably adjusted vertically by jack devices 48 operated in any suitable manner, as by a suitable hydraulic drive system 50 mounted on the wheeled frame 24. Carriage 28 is provided with a forward set of rollers 52 and a rearward set of rollers 54 that operate in the trackways 26, 44 and 46, with the rollers 52 being reversably driven, as by a suitable hydraulic drive arrangement 56 that is mounted on the carriage. Carriage 28 also includes a pusher plate 57 of the type described in my said patents operated by double acting jack devices 55 for moving the mail bag load of a hand truck body 32 off same. Devices 55 are preferably operated by hydraulic drive 53.

It is preferred that the hydraulic drive assemblies 50, 53 and 56 be incorporated in a suitable control arrangement so that the operator can stand adjacent the apparatus 22 and selectively operate the drives 50, 53 and 56, or alternately connect them up for automatic operation once a hand truck body 32 has been moved on to the load support platform 30. I also prefer that the carriage 28 be provided with a suitable limit switch arrangement, such as that indicated at 60 on the foward end of platform 30, for automatically stopping forward movement of the carriage 28 when the desired position has been achieved for unloading a hand truck body 32. The limit switch 60 is actuated by engaging the vehicle body inner end wall 62 or intervening mail bags in the embodiment illustrated, but any other suitable form of indexing arrangement may be employed.

In operation, assuming that a plurality of the hand trucks 12 have been assembled on or adjacent the loading dock 16 and the vehicle body 14 backed into the loading position shown, the apparatus 22 is moved to align the wheeled frame 24 and its trackways 26 with the end opening of the vehicle 14. In this connection, it is here pointed out that in the form shown the vehicle body 14 has a doorway 66 which may be closed as may be necessary or desirable. These, of course, are moved out of the way as part of the preparation for loading vehicle 14.

Assuming the vehicle 14 is positioned as shown, the apparatus 22 is moved adjacent the doorway 66 and disposed so that its trackways 26 will be in longitudinal alignment with the trackways 44 and 46. Apparatus 22 should also be positioned so that the ends 67 of trackways 26 will be spaced in substantial abutting relation with the ends 68 and 70 of trackways 44 and 46, respectively.

Assuming the vehicle body 14 is empty and is to be loaded to capacity, the hydraulic jack devices 48 are operated to position carriage 28 so that its load support platform 30 will be at the level of the hand truck bases 33, which will dispose the roller devices 34 thereof at approximate horizontal alignment with the corresponding roller devices 34A of the hand truck.

The controls for the jack devices 48 are then set to hold the carriage 28 in this position and the first hand truck 12 is then rolled up to one side of the apparatus 22 and as close as convenient to an adjacent trackway 26 to permit a loaded hand truck body to be shifted laterally from its base to the load support 30 over the intervening trackway 26. This may be done by a single individual pushing on the hand truck body or operating a mechanism of the type shown in FIGURE 13 of my said Patent 3,164,271 and in this connection the hand truck body 32 is formed with a guide bar 70 that is to be received between the spaced guide bars 72 of load support 30 for the purpose of guiding the hand truck body 32 properly into position on the load support 30. Hand truck bases 33 are similarly equipped as indicated at 72A, and include movement guiding flanges 73 engaging the sides of the hand truck body bottom walls 75.

It should be mentioned that hand truck bodies 32 in accordance with this invention are preferably loaded in the manner described in my said Patent 3,164,271, which provides a balanced stack of mail bags on the hand truck that is achieved by placing the bags in tiers and coercing the ends of the bags as they drop into place on the hand trucks so that the bags when in place in the stack are in approximate vertical alignment and thus are in well balanced condition. I have found that stacks of three tiers of mail bags provides a load unit that is the most efficient to handle from the standpoint of a proper balance between weight to be lifted and the number of bags to be disposed of at one time. Furthermore, the usual highway vehicle employed for transporting mail bags, such as the vehicle 14, ordinarily is well filled by a load of mail bags stacked six tiers high, and in accordance with this invention, the vehicle 14 is loaded by employing apparatus 22 to form a row 80 of mail bag stacks 82 three tiers high down the length of the vehicle 14 to half fill the vehicle, and then the upper half of the vehicle is filled by placing another row 84 of mail bag stacks 82 on top of the lower row 80 (only the first stack 82 of the upper row 84 is shown in FIGURE 1).

To accomplish this, after a loaded hand truck body 32 is in position on load support platform 30, jack devices 48 are actuated to align the trackways 26 with the trackways 46. When this has been done, the hydraulic drive for jack devices 48 is set to hold the track devices 26 in that position and then hydraulic drive 56 is actuated to motivate rollers 52 which are turned in the direction required to move the carriage 28 along trackways 26 into the vehicle 14 through doorways 66, onto trackways 46, and toward the end wall 62. Movement of the carriage 28 continues until the limit switch 60 engages the end wall 62, whereupon forward movement of the carriage 28 ceases and hydraulic drive 53 is operated to actuate jack devices or hydraulic cylinders 55 which move pusher plate 57 against the load, while at the same time the hydraulic drive 56 is reversed and movement of the carriage 28 started rearwardly at such a rate that the load support 30 is withdrawn from under the mail bags 15 without the mail bags moving lengthwise of the vehicle 14. Thus, the first stack 82A of mail bags is deposited closely adjacent the inner end wall 62 of vehicle body 14 without being dropped any substantial distance. Since the hand truck bodies 32 are proportioned in length so that the individual stacks 82 (and 82A) have a length corresponding to the width of vehicle 14, all the bags of the stack 82 when deposited on the floor 84 of the vehicle will remain in their properly oriented positions extending longitudinally of the vehicle while at the same time the stack 82A will fill the vehicle transversely thereof to the level dictated by the height of the stack.

After the stack 82A is in position, the carriage 22 continues its movement back toward and through the doorway 66 and onto the trackways 26, and when the carriage 28 reaches the relative position lengthwise of the vehicle 14 that is shown in FIGURE 1 rearward movement is stopped preferably by using an appropriate limit switch arrangement (a limit switch for this purpose is indicated at 86 in FIGURE 3 and it engages against a frame member of frame 24).

The jack devices 48 are then operated to position load support 30 at a level in alignment with the base of the then emptied hand truck body 32 whereupon the hand truck body 32 is returned to its base in any appropriate manner.

Succeeding loaded hand trucks are handled in the same manner until the row 80 is formed with the last stack of mail bags in the row completing the action that forms that row. Limit switch 60 engaging against the last stack deposited sets the deposit position of the stack then carried by carriage 28.

The mail bag row 84 is then started by loading the next loaded hand truck body 32 on the carriage load support 30 in the manner already indicated and then operating jack devices 48 to align trackways 26 with trackways 44, which are positioned with respect to trackways 46 such that the mail bag stacks of row 84 will be dropped about the same distance in being placed on the stacks of row 80 as the stacks of row 80 were dropped when being placed on the floor 84 of the vehicle 14.

The carriage 28 is then operated as already described to deposit the first stack 82 of row 84 in the position indicated in FIGURE 1, whereupon the carriage is returned in the manner already described to return the unloaded hand truck body to its base and receive another loaded hand truck body, which is shown in position (in the showing of FIGURE 1) to be moved into the vehicle 14 to deposit its load adjacent the first stack of row 84. This loading action is continued until the row 84 is completed which in turn completes loading of the vehicle 14.

The apparatus 22 then may be shifted to the next vehicle 14 waiting for loading or may be left in position so that another vehicle 14 may be positioned in loading position with respect to it.

It will thus be seen that by invention achieves full loading of the vehicle 14 without any manual handling of the mail bags whatsoever, and without disturbing the balanced stacked condition of the mail bags.

Specific description

The vehicle 14 in practice may be of any suitable type and as already indicated, that shown is in the form of a semitrailer body provided with the usual rear wheels 90 and retractable supporting dolly 92. Tail gate 68 is hinged in place in any suitable manner (not shown) and the doorway 66 may be closed in any suitable manner. The specific vehicle 14 is adapted to be connected to a truck tractor by the usual kingpin (not shown) though it is to be understood that motor trucks and other end loading vehicles provided with trackways 44 and 46 may be readily employed in connection with this invention.

Trackways 44 and 46 each are formed by channel members 94 affixed in any suitable manner to the respective walls 42. Channel members 94 have their webs 96 vertically disposed and their flanges 98 and 100 horizontally disposed with the flange 100 serving as the runway for rollers 52 and 54. The rollers 52 and 54 ride on the inner surface 102 of the respective flanges 100, and thus are disposed in the plane of the flanges 98 and 100 of each trackway.

The wheeled frame 24 comprises (see FIGURES 4 and 5) a U-shaped framework 110 defining legs or sides 112 connected together by a bridge or end structure 114. The sides 112 each comprise an angle member 116 between the like ends 118 of which cross plates 120 are fixed in place (as by welding), with a top plate 122 being fixed to the upper edges of the plates 120 and across the tops of the angle members 116 to form the bridge structure 114.

The angle members 116 comprise horizontal flange portion 124 and depending flange portion 123 and at the forward and rearward ends 125 and 118 respectively of the members 116 spaced plates 126 are positioned (as by welding) to define wheel pockets 128 in which suitable caster assemblies 130 are mounted in any suitable manner to form the wheels of the frame 24.

I prefer to mount the hydraulic drive apparatus 50 on top of plate 122 and this drive may be of any suitable type though it ordinarily would include a prime mover such as an electric or gasoline driven motor 123, a pump 125, a hydraulic liquid reservoir 127, and suitable hydraulic valving and controls 129 as would be necessary to operate hydraulic jack devices 48 in the manner described. Suitable hydraulic conduiting is, of course, connected to hydraulic jack devices 48 in any suitable manner to make them double acting though this has been omitted from the drawings as it is well within the skill of the art to provide such arrangements and their showing would needlessly complicate the drawings.

Within the framework 110, a pair of opposed channel members 132 are mounted, which have their webs respectively fixed as by welding to the respective vertical flanges 123 of angle members 116. Channel members 132 are braced by brace bars 136 that are affixed between the vertical flanges 123 of angle members 116 and the respective channel members 132 (as by welding).

The sides or flanges 138 of channel members 132 define with their respective webs 132 trackways 139 to receive the respective lift bars 140 to which the trackways 26 are affixed as by welding. Trackways 26 each comprise a channel member 142 having its web 144 affixed to the respective lift bars 140 and including sides or flanges 146 which define the guideways 148 of trackways 26. The lower sides 147 form the runways for rollers 52 and 54 of carriage 28 when the carriage 28 is supported by trackways 26.

The channel members 142 defining the trackways 26 are joined together at their rearward ends 150 by a tie plate 152 which also forms the stop that limit switch 86 operates against.

Lift bars 140 are rectangular in cross-sectional configuration (see FIGURE 4) and at their lower ends 154 they are affixed together by tie plate 156. The lift bar upper ends 160 are joined together by spaced cross plates 162 which extend crosswise of trackways 26 and laterally beyond same to define outwardly projecting end portions 164 that have secured to the lower edges thereof the respective mounting plates 166 to which is affixed the piston rod 168 of the respective jack devices 48. Jack devices 48 may be of any suitable type of double acting hydraulic piston and cylinder arrangement known to the art and have their lower ends mounted on abutment structures 170 each comprising a top plate 172 that is affixed to the top edge of a vertical support plate 174 which in turn is affixed to the top flange 124 of the respective angle members 116. Plates 172 and 174 are also fixed as by welding to the respective channel members 138.

Of course, hydraulic jack devices 48 are connected together for simultaneous actuation so that the trackways 26 raise and lower uniformly under the control of the operator.

The carriage 28 comprises a frame 180 comprising spaced side members 182 joined together at their rear ends 184 by rear end members 186; members 182 are joined together at their forward ends 188 by forward member 190. Side members 182 each comprise a vertical plate member 192 to which a top horizontal plate member 194 is affixed as by welding. Members 186 and 190 are channel shaped members having their flanges or sides 196 disposed in opposition to each other.

The jack devices 55 are suitable double acting hydraulic piston and cylinder devices mounted on the respective side members 182 in any suitable manner and have their piston rods 198 affixed to pusher plate 57 in any suitable manner and their head ends 197 abutting suitable brace structure 199 affixed to members 182.

Rollers 52 and 54 are keyed in any suitable manner to their respective shafts 200 and 202 that are in turn journalled in appropriate bearing structures 204 that are operably connected to the sides 182 in any convenient manner. Shaft 200 is driven by suitable electric or hydraulic drive apparatus 56 (including appropriate gear reducers, etc.) through drive chain 206 that engages sprockets keyed to the shaft 20 and the motor of the drive 56 in any appropriate manner.

The hydraulic drive arrangement for hydraulic jack devices 55 is generally indicated at 53 and in practice may comprise any suitable hydraulic arrangement including a suitable prime mover in the form of an electric motor 205 or the like, a hydraulic pump 207, reservoir 209, and suitable valving and controls 211 including appropriate conduiting (not shown) for making jack devices 55 double acting under the control of the operator. The conduit and valving has been omitted from the drawings for simplicity since these are engineering aspects and can be readily worked out by those skilled in the art.

The carriage load supports 30 comprises a frame 210 affixed to frame 182 in any appropriate manner and provided with a plurality of sockets 212 in which suitable ball bearings 214 or the like are journalled for rolling engagement with the undersurface of the hand truck bodies 32. The guide bars 72 are affixed in place in any suitable manner as by welding and serve to restrain the hand truck bodies against movement longitudinally of the vehicle 14 as the balanced stack is ejected therefrom by pusher plate 57. Suitable indexing devices (not shown) may be employed on load support and hand truck bases for centering the hand truck bodies on the latter.

It is preferred that the apparatus 22 may be provided with a control panel 220 at the rear of frame 24 so that operator may stand adjacent same and operate apparatus 22 through push button controls connected to the panel 220. This may be provided for in any suitable manner.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. Apparatus for transferring bagged mail in tier fashion from a loading dock or the like to a load transport vehicle, said apparatus comprising:
one or more hand trucks each comprising a sideless demountable hand truck body mounted on a wheeled base on which mail bags are placed in tier fashion transversely of the truck to form the truck body load,
a wheeled frame adapted to be positioned on the loading dock or the like and including a trackway,
means for raising and lowering the trackway with respect to the frame,
a self propelled carriage moutned on said trackway for movement forwardly and rearwardly of said frame,
said carriage at its forward end including a load support platform adapted to receive a hand truck body having a tiered load of mail bags,
and pusher means carried by said carriage for pushing the load as a unit off the forward end of said platform,
said transport vehicle including a body having mounted therein vertically spaced trackways including means for receiving said carriage at partial and full load elevations in said vehicle body when the vehicle is backed into loading position adjacent the dock,
and means for consecutively transferring said hand bodies between their respective bases and said carriage load support platform,
whereby when said wheled frame is positioned to dispose the forward end of said platform in the direction of said vehicle body, said wheeled frame trackway may be vertically positioned to move a loaded hand truck body from its base to said carriage load support platform whereupon said wheeled frame trackway may be horizontally aligned with one of said vehicle body trackways and said carriage moved over said one trackway to dispose the hand truck body load in its load dumping position, whereupon said pusher means may be actuated to push the hand truck body load as a unit onto the transport vehicle and said carriage returned to said wheeled frame to discharge the emptied hand truck body and unload another in like manner.

2. The apparatus set forth in claim 1 wherein:
said trackways of said transport vehicle body are two in number disposed at half load and full load dumping elevations respectively with respect to said vehicle body,
whereby hand truck bodies carrying half load depth mail bag loads may be first consecutively applied to the lower of said vehicle body trackway to load the vehicle body to half depth and then subsequent hand truck bodies may be consecutively applied to the upper of said vehicle body trackways to load said vehicle to its full depth.

3. Apparatus for transferring bagged mail in tier fashion from a loading dock or the like to an end opening load transport vehicle, wherein the bagged mail has been loaded on one or more hand trucks operating on the loading dock and each compirsing a sideless demountable hand truck body mounted on a wheeled base on which mail bags are placed in tier fashion transversely of the truck to form the truck body load,
said apparatus comprising:
a frame adapted to be positioned on the loading dock or the like and including a trackway,
means for raising and lowering the trackway with respect to the frame,
a self propelled carriage mounted on said trackway for movement forwardly and rearwardly of said frame,
said carriage at its forward end including a load support platform adapted to receive a hand truck body having a tiered load of mail bags.
and pusher means carried by said carriage for pushing the load as a unit off the forward end of said platform,
with the transport vehicle body having mounted therein vertically spaced trackways including means for receiving said carriage at partial and full load elevations in said vehicle body, and means for transferring said hand bodies between their respective bases and said carriage load support platform, whereby when said frame is positioned to dispose the forward end of said platform in the direction of said vehicle body, said frame wheeled trackway may be vertically positioned to move a loaded hand truck body from its base to said carriage load support platform whereupon said frame trackway may be horizontally aligned with one of said vehicle body trackways and said carriage moved over said one trackway to dispose the hand track body load in its load dumping position at the inner end of the vehicle, whereupon said pusher means may be actuated to push the hand truck body load as a unit onto the transport vehicle and said carriage returned to said wheeled frame to discharge the emptied hand truck body and unload another in like manner.

4. The apparatus set forth in claim 3 wherein:

said trackways of said transport vehicle body are two in number disposed at half load and full load dumping elevations respectively with respect to said vehicle body, whereby hand truck bodies carrying half load depth mail bag loads may be first consecutively applied to the lower of said vehicle body trackway to load the vehicle body to half depth and then subsequent hand truck bodies may be consecutively applied to the upper of said vehicle body trackways to load said vehicle to its full depth.

5. Apparatus for transferring bagged mail in tier fashion from a loading dock or the like into the load receiving area of an end loading transport vehicle and utilizing hand trucks each comprising a separable sideless hand truck body resting on a wheeled base, and wherein the transport vehicle is provided with longitudinally extending upper and lower trackways on the sidewalls thereof in said loading area with the lower trackway disposed adjacent the floor of said area and the upper trackway disposed adjacent the half load level of the vehicle, said apparatus comprising:

a frame adapted to be positioned on the dock and including a trackway, means for raising and lowering said frame trackway with respect to said frame, a carriage mounted on said frame trackway for movement forwardly and rearwardly of said frame, said carriage at its forward end including a load support platform including means for transferring thereto from its base one of the hand truck bodies having a tiered mail bag load having a height of approximately one half the load depth of the vehicle when said frame trackway is in a lowered position, pusher means carried by said carriage for pushing from a hand truck body received on said load support hand truck body loads as a unit off the forward end of said platform, means for aligning the frame trackway with one of the vehicle trackways laterally of the vehicle, and means for moving said carriage between and along the aligned trackways to move the hand truck body load from said frame to its loading position in the load receiving area of the vehicle whereupon said pusher means may be actuated to unload the mail bag load from the frame.

6. Apparatus for transferring bagged mail in tier fashion from a loading dock or the like into the load receiving area of an end loading transport vehicle backed into load receiving position adjacent the dock to dispose its end opening to receive the mail bags, wherein the transport vehicle is provided with longitudinally extending vertically spaced trackways on the sidewalls thereof in said loading area and extending to said end thereof, said apparatus comprising:

a frame adapted to be positioned on the dock adjacent the load receiving position of the vehicle and including a horizontally disposed trackway, means for raising and lower said frame trackway with respect to said frame, a carriage mounted on said frame trackway for movement forwardly and rearwardly of said frame, said carriage including a load support and means for applying thereto a tiered mail bag load, means carried by said carriage for discharging therefrom the mail bag load carried thereby as a unit off the forward end of said support, means for aligning the frame trackway with one of the vehicle trackways laterally of the vehicle, and means for moving said carriage between and along the aligned trackways to move the mail bag load when carried by said carriage from said frame to its loading position in the load receiving area of the vehicle whereupon said discharging means may be actuated to unload the mail bag load from the frame.

References Cited

UNITED STATES PATENTS

| | | | |
|---|---|---|---|
| 2,833,435 | 5/1958 | Levy | 214—515 |
| 3,221,912 | 12/1965 | McWilliams | 214—514 |

ROBERT G. SHERIDAN, Primary Examiner

U.S. Cl. X.R.

214—16.4, 515

PO-1050
(5/69)

UNITED STATES PATENT OFFICE
CERTIFICATE OF CORRECTION

Patent No. 3,458,064            Dated   July 29, 1969

Inventor(s)      Joseph E. McWilliams

It is certified that error appears in the above-identified patent and that said Letters Patent are hereby corrected as shown below:

Column 8, line 7, for "moutned" read -- mounted --; same column 8, line 25, for "wheled" read -- wheeled --; same column 8, line 56, for "compirsing" read -- comprising --.
Column 9, line 14, for "track" read -- truck --.
Column 10, line 27, for "lower" read -- lowering --.

SIGNED AND
SEALED
APR 28 1970

(SEAL)
Attest:

Edward M. Fletcher, Jr.
Attesting Officer

WILLIAM E. SCHUYLER, JR.
Commissioner of Patents